(12) United States Patent
Elberson (10) Patent No.: US 6,874,404 B1
(45) Date of Patent: Apr. 5, 2005

(54) COMPRESSED AIR FLOW RATE CONTROLLER

(75) Inventor: Michael D. Elberson, Elm Grove, WI (US)

(73) Assignee: Autoquip, Inc., Menomonee Falls, WI (US)

( * ) Notice: Subject to any disclaimer, the term of this patent is extended or adjusted under 35 U.S.C. 154(b) by 12 days.

(21) Appl. No.: 10/361,237

(22) Filed: Feb. 10, 2003

Related U.S. Application Data (60) Continuation-in-part of application No. 09/772,834, filed on May 7, 2001, now Pat. No. 6,516,707, which is a division of application No. 09/322,425, filed on May 28, 1999, now Pat. No. 6,223,645.

(51) Int. Cl.$^7$ ............................................... F15B 11/14
(52) U.S. Cl. ....................................................... 91/435
(58) Field of Search ...................... 91/435; 137/599.09, 137/599.11, 601.18, 601.2, 503

(56) References Cited

U.S. PATENT DOCUMENTS

| | | |
|---|---|---|
| 1,860,516 A | 5/1932 | Thomas et al. |
| 1,906,855 A | 5/1933 | Heyl |
| 2,147,568 A | 2/1939 | Barber |
| 2,190,326 A | 2/1940 | Benoit |
| 2,558,681 A | 6/1951 | Hachmeister |
| 2,957,631 A | 10/1960 | Armstrong |
| 3,275,240 A | 9/1966 | Peaslee et al. |
| 3,322,351 A | 5/1967 | Hackel |
| 3,369,705 A | 2/1968 | Curtis et al. |
| 3,665,959 A | 5/1972 | Castilon |
| 4,100,927 A | 7/1978 | Barnes, Jr. |
| 4,194,526 A | 3/1980 | Stromberg |
| 4,198,860 A | 4/1980 | King |
| 4,284,032 A | 8/1981 | Moos et al. |
| 4,287,909 A | 9/1981 | Tompson et al. |
| 4,474,680 A | 10/1984 | Kroll |
| 4,632,309 A | 12/1986 | Reimer |
| 4,792,092 A | 12/1988 | Elberson et al. |
| 4,928,880 A | 5/1990 | Prus et al. |
| 5,117,797 A | 6/1992 | Telep et al. |
| 5,318,225 A | 6/1994 | Condron |
| 5,325,884 A | 7/1994 | Mirel et al. |
| 5,480,349 A | 1/1996 | Kolta |
| 5,553,493 A | 9/1996 | Box et al. |
| 5,586,045 A | 12/1996 | Box et al. |
| 5,676,310 A | 10/1997 | Hynds |
| 5,932,812 A * | 8/1999 | Delsing .................... 73/861.02 |
| 6,223,645 B1 | 5/2001 | Elberson |
| 6,516,707 B2 * | 2/2003 | Elberson ....................... 91/435 |

OTHER PUBLICATIONS

"Weight of Spray Gun" [subheading in excerpt from untitled article], by Ron Joseph, *metal Finishing*, Jan. 1998, pp. 65, 66, and [unnumbered third page].

"How to Get the Most from HVLP Guns by Understanding Air Pressure and Volume," by Ron Joseph, *Metal Finishing*, Aug. 1998, pp. 20, 22 and 24.

* cited by examiner

*Primary Examiner*—Edward K. Look
*Assistant Examiner*—Igor Kershteyn
(74) *Attorney, Agent, or Firm*—Boyle Fredrickson Newholm Stein & Gratz, S.C.

(57) ABSTRACT

A controller for controlling the flow rate of compressed air to a spray paint gun as well as to a comparable tool which is optimally operative dependant upon receiving a specified flow rate of air includes a flow control valve which regulates the air flow rate therethrough based on a pressure differential signal received from an air flow meter. The pressure differential signal transmitted to the air flow controller is balanced against an opposing spring biased needle in the flow controller.

4 Claims, 8 Drawing Sheets

Fig. 10

COMPRESSED AIR FLOW RATE CONTROLLER

RELATED APPLICATIONS

This application is a continuation-in-part of application Ser. No. 09/772,834 filed May 7, 2001, now U.S. Pat. No. 6,516,707, which is a division of application Ser. No. 09/322,425, filed May 28, 1999, and patented as U.S. Pat. No. 6,223,645.

BACKGROUND OF THE INVENTION

1. Field of the Invention

The present invention relates to an apparatus and method for controlling the flow of compressed air, and in particular for controlling the flow rate of compressed air to a paint spray system and to other which are optimally operatice dependent upon receiving a specified flow rate of air.

2. Background of the Invention

Many factories use compressed air as a source of power for operating various types of production equipment. "Compressed air," which is sometimes referred to as "pressurized air" or referred in spray paint operations as "atomization air," is defined as free air that has been pressed into a volume that is smaller than it normally occupies. Controlled expansion of the compressed air can be used as a source of power to operate a wide range of pneumatically powered tools.

Compressed air is typically supplied from onsite or nearby compressors and piped through a distribution system to a downstream point of use. Paint spraying operations for painting various types of manufactured products, including especially automobiles and airplanes, is one typical use of compressed air.

In a spray paint operation, a paint fluid, which can be in the form of either a liquid or a fine powder, is mixed together with compressed air in a spray gun nozzle in order to atomize the paint into extremely fine particles and to transfer the paint particles onto the surface of the item being painted. One commonly used spray paint gun, referred to in the industry as a high volume low pressure (HVLP) spray gun, generates high volumes of low pressure air which transfers the paint particles to the surface of the article being painted with a relatively low velocity. Other uses of compressed air include pneumatically powered machine tools, drills and wrenches, and other pneumatically powered items which are optimally operative dependent upon receiving a specified flow rate of the pressurized air into the tool.

Major changes in downstream air demand create varying loads on the compressors. Air compressors are typically controlled according to system supply pressure, coming online as the system air pressure at the compressor drops below a threshold pressure and going offline at a higher cutout pressure. This is a rather crude method of controlling air supply, especially as air compressors are normally quite slow to respond to change.

Industrial compressed air systems are commonly controlled by pressure regulation, meaning, by regulating the nominal air pressure at a certain point in the system. A pressure regulator might be placed, for example, at or near the compressor, at one or more points on the distribution line, or on a hose which used to supply air to the tool. The major disadvantage with this method is that measuring air pressure at only one particular point in the system is not necessarily a good indicator of the air pressure at another point in the system. Air pressure drops as it flows through the system, and the amount that the air pressure drops from one point to the next varies greatly depending on the specific installation and also on varying conditions of usage during the course of the day. In many cases a compressed air system supplies not only spray guns but also other devices used in a paint shop such as sanders, polishers, screw drivers, drills and so forth. The intermittent operation of such other tools will affect the air pressure throughout the system.

For paint spray operations in particular, one commonly used method for determining whether a sufficient amount of compressed air is being delivered to the spray gun is to place a pressure gage on the cap of the spray gun immediately after the painter has set the spray gun for proper atomization of the paint but before he actually begins painting. Many operators, however, find this extra step to be a great inconvenience which interrupts their painting operations, and so they often do not do it. Another method to checking whether a sufficient amount of compressed air is being delivered to the spray gun is to attach an air pressure regulator and gage to the handle of the gun. However, attaching a pressure regulator to the gun naturally increases its weight. Over a period of time, muscle fatigue sets in, thereby causing the operator to use unnatural arm and wrist actions, which cause overspray or underspray conditions and other flaws in the paint job.

More importantly, regulating the nominal pressure at any one point in the system does not necessarily mean that the proper amount of air, or even any air is flowing at another point downstream. There may be a blockage in the spray nozzle of a paint gun, or a break in the line or some other problem in the system.

The difficulty in delivering a proper amount of compressed air to a spray paint nozzle is further exasperated by the fact that paint viscosity varies due to temperature fluctuations. If the temperature of the paint varies, the amount of paint fluid delivered to the nozzle of the spray gun also varies. Therefore, to compensate for the change in viscosity of the paint fluid, the amount of compressed air delivered to the spray gun nozzle must be adjusted. This type of adjustment is not easily done with only pressure regulation, and at a minimum requires a great deal of testing and trial and error to achieve the proper settings. Additionally, in many typical spray paint operations a single compressor is used to deliver compressed air to a number of output points. Each point is located a different distance from the air compressor, and so the pressure drops from the compressor to one point or the other will differ. Further, hoses which deliver air from the output point on the wall to the spray gun in the paint booth often differ in length, diameter or both, which greatly affects the pressure drop from one end of the hose to the other. Additionally, different types of spray paint guns, which require different amount of pressurized air, may be employed. The number of variables which are encountered during the course of operations thus increase to the point where it is nearly impossible to control the amount of compressed air delivered to the spray paint gun based merely on regulating the nominal air pressure at any particular point in the system.

Accordingly, an improved means for controlling the flow rate of compressed air delivered to a spray paint gun, as well as to other types of pneumatic tools which are optimally operative dependent upon receiving a specified flow rate of compressed air is desired.

SUMMARY OF THE INVENTION

A method and apparatus for monitoring and compensating the flow rate of compressed air delivered to a paint spray gun and other comparable pneumatic tools comprising both air flow rate and pressure based control of the compressed air system is disclosed. The invention includes an apparatus and method for measuring the air flow rate between two points in the system, comparing the measured flow rate to a desired flow rate, and then adjusting the flow rate in response to a difference between the measured flow rate and the desired flow rate, if any, and for also regulating the ultimate pressure in the system.

Generally, the present invention of an apparatus and method for controlling the air flow rate to a spray paint gun comprises: providing a source of compressed air; providing a source of paint fluid; mixing the paint fluid with the compressed air to thereby atomize the paint fluid and thereby transfer the atomized paint fluid to a substrate; measuring the flow rate of the compressed air by measuring a pressure differential across a fixed orifice located at a point downstream from the source of compressed air but upstream from where the compressed air is mixed with paint fluid; comparing the measured pressure differential to a desired pressure differential; and, in response to a difference between the measured pressure differential and the desired pressure differential, if any, adjusting the flow rate so that the measured pressure differential will equal the desired pressure differential. The above-described apparatus and method for controlling air flow rate is also preferably used in combination with a pressure regulating circuit that controls the ultimate pressure in the compressed air system particularly when the air flow rate drops to zero.

In the present invention, a pressure differential signal is generated by directing the compressed air through a fixed orifice obstruction, and by measuring the relative pressure difference between two points on either side of the orifice. The pressure differential signal is transmitted to a control device which compares the measured pressure signal to a desired pressure differential signal, and if there is a difference makes an automatic correction to adjust the flow rate to a desired amount. When the pressure differential signal is zero, which means that the air flow rate is also zero because the tool has been deactivated, the system automatically reverts to pressure regulation circuit. Thus, by controlling the rate of air delivered to the spray gun or other tool, as opposed to merely controlling the nominal air pressure at a single point in the system, the operator is assured that the proper amount of compressed air will be delivered to the tool. Additionally, when the tool is deactivated, the pressure regulation circuit assures that an overpressurization of the system will not occur.

The present invention of an air flow rate control method and apparatus provides a number of significant advantages over mere pressure regulation methods in the prior art. Such advantages include providing consistent air flow to the pneumatic tool regardless of supply hose diameter or length. The monitoring of flow rate can be used to detect various problems in the system such as pinched hoses, malfunctions of the tools, and other unexpected abnormalities in the demand or supply of the pressurized air.

Installations such as body shops normally include several air outlets so that the painter can disconnect the spray gun and move to various locations within the spray booth. Such installations now require several pressure regulators to be installed inside the spray booth. By using the air flow control of the present invention, a single supply pipe can be installed circling the spray booth area and the proper amount of compressed air will be delivered to the tool regardless of the location of the operator.

Other objects and advantages of the invention will become apparent from the following description which, taken in connection with the accompanying drawings, set forth by illustration and example certain embodiments of the present invention.

BRIEF DESCRIPTION OF THE DRAWINGS

The drawings, which constitute part of the specification and include exemplary embodiments of the present invention, include the following.

DETAILED DESCRIPTION OF THE PREFERRED EMBODIMENT

Figure 1:
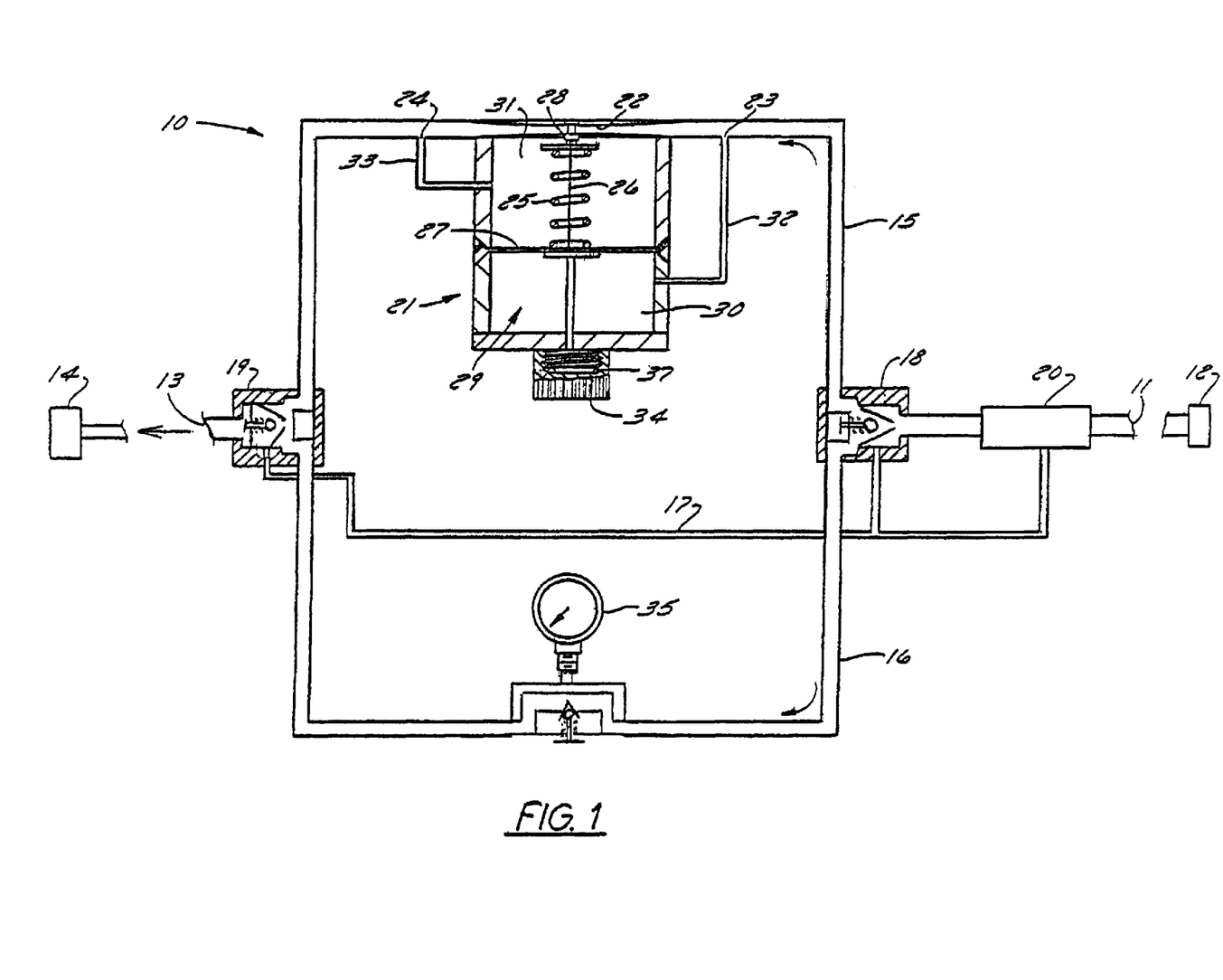
FIG. 1 is a pneumatic illustration of a first embodiment of a device for controlling the flow rate of compressed air delivered from an air source to a point of use in accordance with the principles of the present invention.
Figure 2:
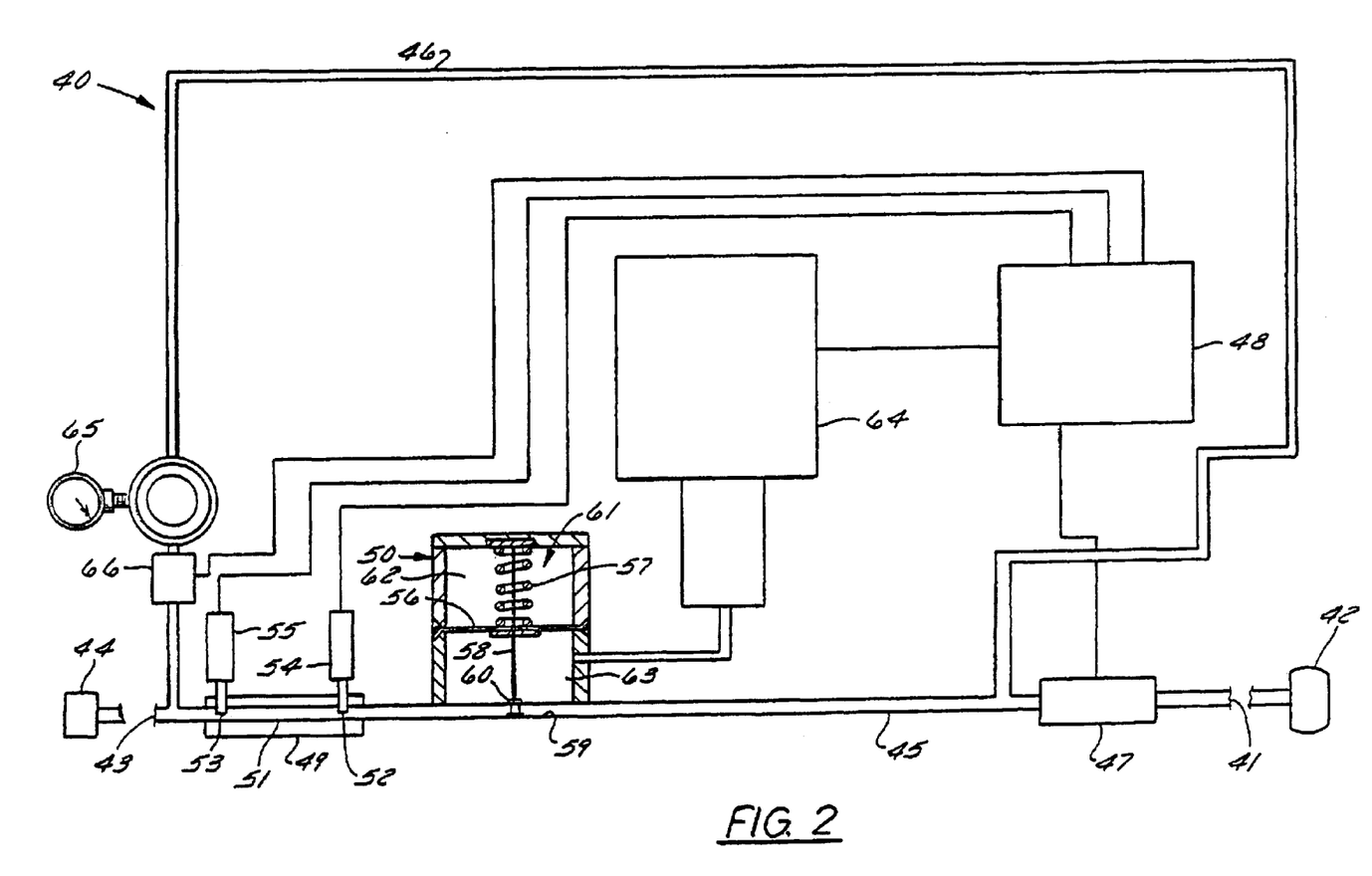
FIG. 2 is a pneumatic and electrical illustration of a second embodiment of a device for controlling the flow rate of compressed air in accordance with the principles of the present invention.
Figure 3:
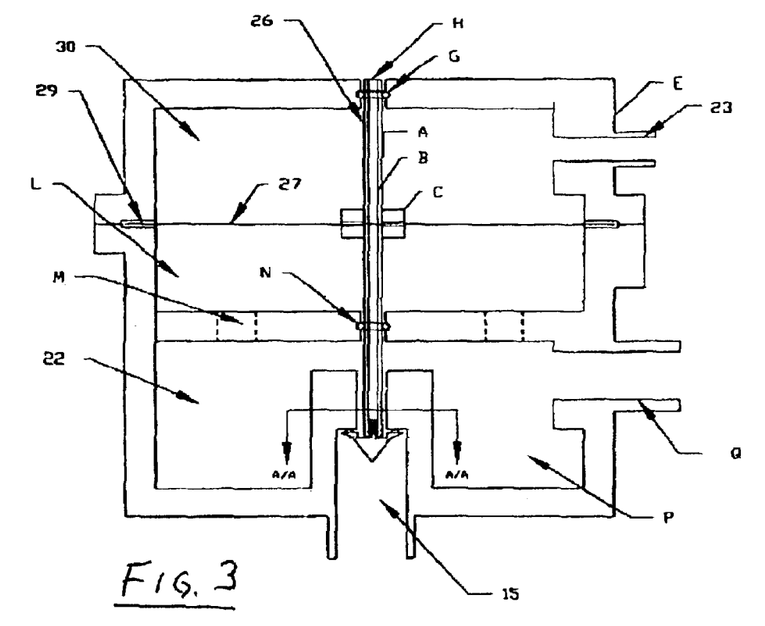
FIG. 3 is a pneumatic illustration of a typical pressure regulator.

Referring to FIGS. 1 and 2, the invention disclosed herein relates to a method and apparatus for controlling the air flow rate of compressed air, sometimes referred to as either pressurized air or as atomization air, to a tool. The method and apparatus are particularly useful for use in connection with a spray paint operation, in which the compressed air is mixed with a volume of liquid or powdered paint in order to atomize the paint fluid into minute particles and transfer the paint particles onto the surface of an item being painted. The invention disclosed herein is also adaptable for use with other types of pneumatically powered tools in which the optimal operation of the tool is dependent upon receiving a predetermined or desired flow rate of compressed air, such as, for example, air powered tools that require constant rpm or torque. FIG. 1 illustrates a first embodiment of the present invention, which essentially comprises a mechanical flow rate control apparatus. FIG. 2 illustrates a second embodiment of the invention, which essentially comprises an electromechanical flow rate control apparatus. Both embodiments arc based on the principle that the flow rate of a fluid through a passageway of known dimension can be calculated by determining pressure differential between two points in the passage, and by comparing the measured pressure differential to a desired pressure differential, the actual flow rate can then be adjusted to reach and maintain a desired flow rate. Both embodiments also provide a dual means for controlling the compressed air systems, that is, by monitoring and adjusting the air flow rate when the tool is activated and air is flowing through the system and also by monitoring and regulating the overall pressure in the system especially when the tool has been deactivated and there is no air flow through the system.

Referring to FIG. 1, a mechanical compressed air flow rate control apparatus 10 in accordance with the present invention includes an air inlet 11 for receiving compressed air from an air pressurizing source 12, such as a compressor, and an air outlet 13 for transmitting the compressed air to a tool 14, such as a paint spray gun. Between the air inlet 11 and air outlet 13 is a first air flow path 15, a second air flow path 16, and a pilot air flow path 17. Two air flow diverter valves, namely, a first air diverter valve 18 and a second air diverter valve 19, direct the flow of air from the inlet to the outlet through either the first air flow path 15 or second air flow path 16. The diverter valves are each essentially a three-way valve which select the direction of air flow. Specifically, the first air diverter valve 18 is connected adjacent to the air inlet 11, and the first air diverter valve 18 directs the flow of air from the air inlet to either the first air flow path 15 or the second air flow path 16. Similarly, the second air diverter valve 19 is connected at or near the air outlet 13, and the second diverter valve receives pressurized air from either the first air flow path 15 or second air flow path 16, and directs it to the air outlet 13 and thus to the tool 14. An air flow switch 20 located upstream from the first diverter valve 18 is used to actuate the pilot air flow path 17, which in turn actuates the first and second air diverter valves (discussed further below).

The first air flow path 18 is essentially a pipe or tube structure which provides a pneumatic passageway for the air to flow from the first diverter valve 18 to the second diverter valve 19. The first air flow path includes an air flow controller 21 located between the first and second diverter valves. The air flow controller 21 includes a fixed orifice obstruction 22 for producing a pressure differential between a first point 23 and a second point 24 in the first air flow path 15. The internal geometry of the obstruction in the orifice creates a resistance to the air flowing through the first air flow path. The resistance produces a pressure drop between the first point 23 and second point 24, in the flow path. Of course, the volume of air flowing through a passage of fixed dimension is dependent upon the pressure differential between two longitudinally spaced apart points in the air flow passageway. If the difference in pressure between the two points is zero, then obviously the flow rate is also zero. As the difference in pressure between the two points increases, the flow rate of the air likewise increases. Thus, the pressure difference of air flowing through the orifice can be used to both monitor and control the flow rate.

The air flow controller 21 further includes a spring 25 which biases a needle 26, and a diaphragm 27 for controlling the position of the needle. The needle 26 is positioned laterally to the path of air flowing through the fixed orifice obstruction 22. Further, the needle 26 protrudes through an opening 28 in the center of the fixed orifice obstruction 22, and the needle is slidable into and out of the fixed orifice. As a result, the position of the needle controls the amount of air flowing through the fix orifice obstruction. The needle 26 is normally biased by the spring 25 in the open position, meaning that the needle is fully retracted out of the opening 28 so that the air flow passageway in the orifice is completely clear. As the needle 26 gradually protrudes through the opening and into the orifice the flow of air through the orifice becomes partially or fully blocked, which consequently reduces the amount of air flowing through the device.

The needle 26, spring 25 and diaphragm 27 are contained within an air chamber 29 inside the air flow controller 21, with the diaphragm 27 essentially dividing the air chamber 29 into a first subchamber 30 and a second subchamber 31, the first subchamber 30 of course being on one side of the diaphragm 27 and the second subchamber 31 being on the other side of the diaphragm 27. As mentioned, the fixed orifice obstruction 22 produces a pressure differential between a first point 23 and a second point 24 in the first air flow path. A first air portal tube 32 pneumatically connects the first point 23 to the first subchamber 30. A second air portal tube 33 pneumatically connects the second point 24 in the fixed orifice obstruction to the second subchamber 31.

When the pressure differential between the first point and second point is zero, the spring 25 biases the needle 26 so that the fixed orifice is in the fully open position. As the air flow rate through the fixed orifice increases, a pressure differential will be created between the first point 23 and the second point 24.

The nominal pressure valve at the first point 23 in the flow path is transmitted through the first air portal tube 32 into the first subchamber 30 of the air flow controller 21, and the nominal pressure valve at the second point 24 in the flow path is transmitted through the second air portal tube 33 to the second subchamber 31 in the air flow controller, so that substantially the same pressure differential that exists between the first and second points in the air flow path is reproduced between the first and second subchambers in the air flow controller. As a result, as the pressure differential between the first and second points in the air flow path becomes increased, the pressure in the first subchamber 30 of the flow controller 21 likewise becomes increased relative to the air pressure in the second subchamber 31, thereby causing the diaphragm 27 to deflect and depress the needle 26 into the opening 28 in the fixed orifice and thereby balance the air flow. The desired flow rate of the compressed air is achieved when the pressure differential between the first subchamber 30 and second subchamber 31 in the flow controller 2 is balanced against the spring force of the needle 26.

The air flow rate can be manually adjusted by rotating a manual adjusting knob 34 on the flow controller 21, which contains a counteracting spring 37. The force of the counteracting spring 37 acts in the opposite direction of the force produced by spring 25. Thus, by tightening the knob 34, the counteracting spring 37 urges the needle 26 toward the opening 28 in the orifice which in effect reduces the air flow rate. Conversely, by untightening the knob 34 the spring force of the counteracting spring 37 is reduced which in turn allows the needle to retract from the opening 28 in the orifice and thereby effectively increase the flow rate.

As mentioned, the second air flow path 16 is essentially comprised of a pneumatic conduit which extends from the first diverter valve 18 to the second diverter valve 19. The second air flow path includes a pressure gauge 35 with a pressure relief valve located between the two diverter valves.

The air flow controller illustrated in FIG. 1 operates in substantially the following manner.

When the spray gun or other tool 14 is not triggered, the air flow switch 20 located in the supply airline would not be activated and the pilot air path 17 from the air flow switch would not be pressurized. Upon triggering the tool, the air flow switch 20 pressurizes the pilot air path 17 thereby causing the first and second three-way diverter valves 18 and 19 to switch so that the flow of air is directed through the first air flow path 15. With the diverter valves activated the flow control valve 21 modulates the flow rate based on pressure differential between the first and second points 23 and 24 in the fixed orifice.

The spring pressure on the needle 26 adjusts the flow rate through the flow control valve. With no flow, the flow control valve 21 would be wide open. As flow increases, the valve gradually closes based on the pressure drop between the first and second air portal tubes 32 and 33 in the flow controller 21. The resultant flow rate is based on balancing the pressure differential force of the diaphragm 27 which is produced by the pressure drop across the valve and the force of the spring 25 urging the needle 26 valve open.

When the spray gun or tool 14 is triggered off, the air flow of course stops. When the flow through the air flow switch 20 drops to zero, the pilot signal in the pilot air path 17 is exhausted out through the air flow switch 20. As a result, the first and second air diverter valves 18 and 19, which are spring biased, automatically switch back to divert the compressed air through the second air path 16 which provides for a pressure control. Since the regulator 35 on the pressure loop 16 is self-relieving, any over pressurization of the system will be relieved.

An electromechanical flow control apparatus 40 which produces substantially the same results is shown in FIG. 2. Referring to FIG. 2, the electromechanical air flow controller 40 likewise includes an air supply inlet 41 for receiving compressed air from an air pressurizing source 42, and an air outlet 43 for transmitting the compressed air to the tool 44. Between the air inlet and air outlet are a first air flow path 45 and a second air flow path 46. Also, at or near the air inlet is an air flow switch 47. The air flow switch is electrically connected to an electronic microprocessor 48 which controls the opening and closing of a downstream solenoid valve 66 (discussed further below).

On the electromechanical air flow controller shown in FIG. 2, the first air flow path 45 includes a pressure differential air flow control meter 49 and a flow control valve 50. The pressure differential air flow control meter 49 similarly includes a fixed orifice obstruction 51 for producing a pressure differential between a first point 52 and a second point 53 in the first air flow path. At the first point 52 is a first pressure transducer 55 for measuring the nominal air pressure and for generating an electronic signal in response to the measured nominal air pressure at that first point 52. At the second point 53 on the flow meter 49 is a second pressure transducer 55 for measuring the nominal air pressure and for generating a second electronic pressure signal responsive to the measured nominal air pressure at that second point 53. As air flows through the flow meter 49, the fixed orifice obstruction produces a difference in pressure between the first and second points 52 and 53, which consequently produces an electronic pressure differential signal generated by the first and second pressure transducers 54 and 55. The first and second pressure transducers 54 and 55 are each electrically connected to the microprocessor 48.

The flow control valve 50 is located upstream from the differential pressure flow meter 49. The flow control valve 50 for the electromechanical flow controller likewise includes a diaphragm 56, spring 57 and needle 58 combination for controlling the air flow through the first air flow path 45. Specifically, the flow control valve 50 comprises a needle 58 which extends laterally to a passageway 59 in the first air flow path 45, the needle 58 being slidable through a lateral opening 60 in the passageway 59. The needle 58 is normally in the fully retracted position, meaning that the passageway 59 is normally open. The air flow rate through the passageway 59 is controlled by sliding the needle 58 through the lateral opening 60 to partially or in some cases completely block the air flow through the passageway 59. The flow control valve 50 further comprises an air chamber 61 subdivided by the diaphragm 56 into a first subchamber 62 and a second subchamber 63. The position of the needle 58 is controlled by deflection of the diaphragm 56. One of the subchambers 63 in the flow control valve 50 is pneumatically connected to a voltage to pneumatic converter 64. The voltage to pneumatic converter 64 is also electrically connected to the microprocessor 48. The flow control valve 50 is thus arranged to control the amount of compressed air flowing through the first air path 45 in response to the electronic signals produced by the first and second pressure transducers 54 and 55.

The second air flow path 46 further includes a pressure regulator 65 and a solenoid valve 66 for opening and closing the second air flow path. The electronic microprocessor 48 therefore receives electronic signals from the air flow switch 47 and receives further signals from the first and second pressure transducers 54 and 55 in the differential pressure flow meter 49, and depending on the signals received, controls the opening and closing of the solenoid valve 66 in the second air flow path 46, and controls the voltage to pneumatic converter 64 which in turn produces a pneumatic signal to control the position of the needle 58 in the flow control valve 50 in the first air flow path 45.

The electromechanical air flow controller 40 shown in FIG. 2 operates substantially as follows. When the tool 44 has not yet been triggered, the system is pressurized, but in a static ready condition. The solenoid valve 66 is open, and system pressure is regulated by pressure regulator 65. Upon triggering the tool 44, the air flow switch 47 at the air inlet 41 is activated, meaning that the flow of air through the air flow switch 47 produces an electronic signal to that effect which is transmitted to the microprocessor 48, which in turn transmits a further electronic signal to close the solenoid valve 66. Thus, air now flows from the air inlet 41 to the air outlet 43 only through the first air path 45. As air flows through the pressure differential flow meter 49, a pressure differential between the first and second points 52 and 53 causes the first and second pressure transducers 54 and 55 to generate an electronic pressure differential signal which is sent to the microprocessor. The electronic pressure differential signal is compared to a desired signal, and depending upon the difference in value between the measured signal and the desired signal the microprocessor directs the voltage to pneumatic converter to produce and transmit a pneumatic signal which is sent to the air flow control 50. The pneumatic signal sent to the air flow controller 50 causes a deflection in the diaphragm 56 to either open the flow control valve to permit a greater flow of pressurized air through the system, or close the air control valve in order to restrict the amount of air flowing through the system.

When the tool 44 is triggered off, air flow through the pressure differential flow meter 49 stops. When there is no air flow through the pressure differential flow meter 49, the electronic signal produced by the first and second pressure transducers 54 and 55 is equal, which causes the flow control processor 48 to open the solenoid valve 66 in the second air flow path 46, and thereby revert the system back to pressure regulation status.

Figure 4:
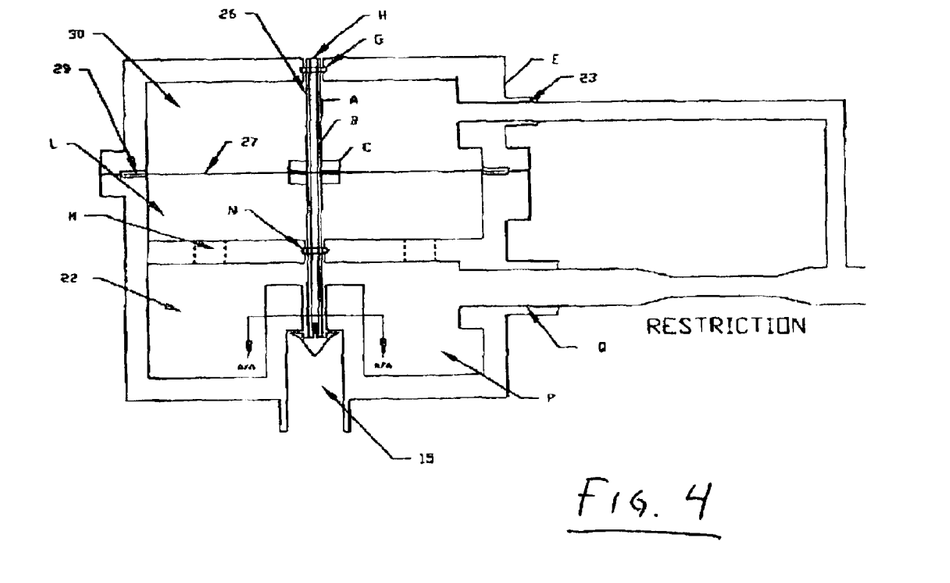
FIG. 4 is a pneumatic illustration of a pressure regulator modified in accordance with the principles of the present invention to make itto a flow control valve.

FIGS. 3–10 illustrate additional embodiment of a device for controlling the flow rate of compressed air in accordance with the principles of the present invention. For comparison purposes FIG. 3 details a typical pressure regulator. FIG. 4 shows the modifications made to make it a flow control valve. Essentially two signals are required for the device to function as a flow rate controller: flow on/off and flow/pressure rate. Electronically this could be accomplished using one signal where 0 voltage would equal no flow and positive voltage pressure and negative voltage flow.

Figure 5:
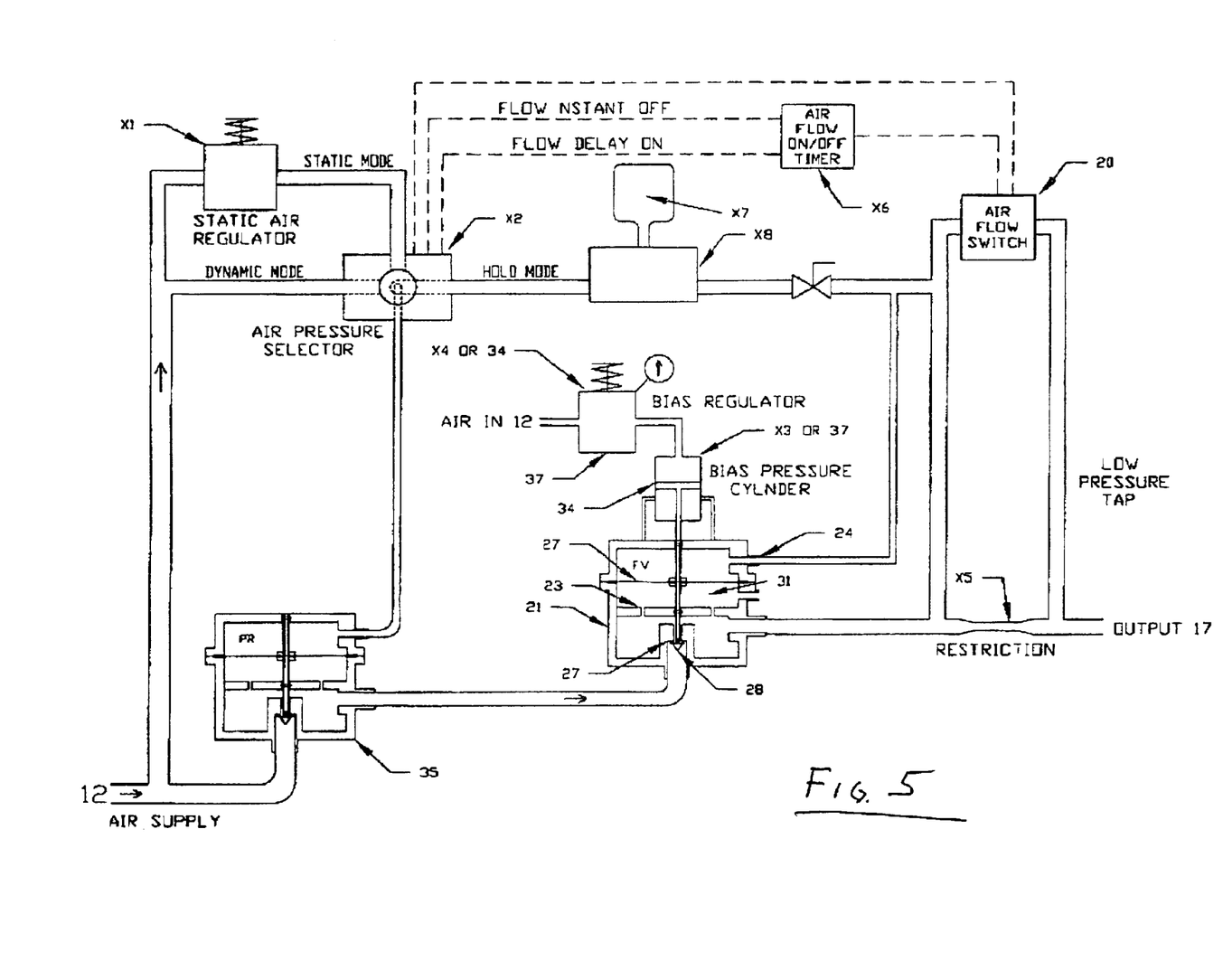
FIG. 5 is a pneumatic and electrical illustration of a third embodiment of a device for controlling the flow rate of compressed air in accordance with the principles of the present invention.

FIG. 5 illustrates a third embodiment of a device for controlling the flow rate of compressed air in accordance with the principles of the present invention. The device in FIG. 5 adapts pneumatic circuitry to address slow deactivation signal in a high pressure system.

In the static state, air enters at 12 into a primary pressure regulator 35. Due to the logic state of the air pressure selector 2 the bias for the primary regulator is from the static air regulator x1. The flow valve FV is fully open due to the pressure on the bias cylinder x3 via the bias cylinder regulator x4. The output 17 is equal to the pressure set on the static air regulator x1.

For dynamic adjusting of the flow rate, upon airflow, the pressure across the restriction x5 develops a pressure drop that triggers the airflow switch 20. The signal for the airflow switch 20 changes the state of the air pressure selector x2 from static mode to dynamic mode, which in turn changes the control pressure from regulated to main line air. The main line air opens the regulator to a full open position. The airflow switch 20 also activates an airflow timer, x6 which provides a adjustable delayed control signal.

As the air starts to flow through the system to output 17 is flows through x5, which develops additional drop providing a feedback to the flow valve for controlling the airflow. The amount of airflow is a ratio between the diaphragm 27 area and the bias cylinder force. If the restriction x5 is 5 psi at a max flow rate 20 CFM and the diaphragm is 3" in diameter, the bias cylinder would require 35 PSI for equilibrium. During this adjustment stage of the circuit, the flow valve FV will make the proper corrections in opening to obtain the correct flow rate. The output pressure required to provide the correct flow rate is piped into a holding reservoir for the hold mode.

A third mode, referred to as hold mode, is proposed in this method. The hold mode traps the high-pressure feedback air into a reservoir. Upon time out of the flow 20 control timer x6, the hold mode on/off valve x8 is closed and the airflow control valve x2 is selected to hold. The hold mode changes the bias to the pressure regulator to the current required pressure and holds the output of the flow rate at that pressure until the tool is turned off and back on again.

Figure 6:
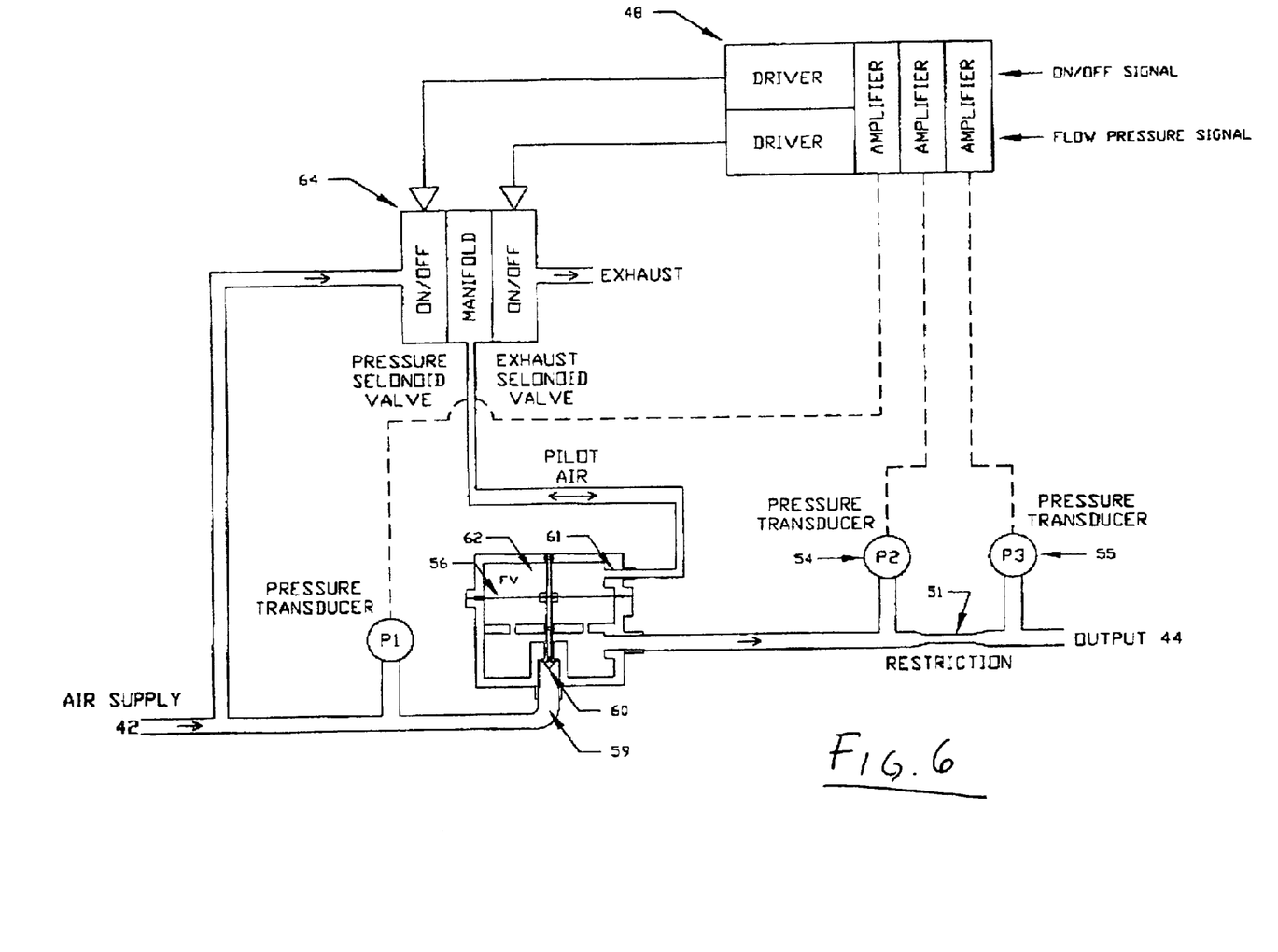
FIG. 6 is a pneumatic and electrical illustration of a fourth embodiment of a device for controlling the flow rate of compressed air.

FIG. 6 is a pneumatic and electrical illustration of a fourth embodiment of a device for controlling the flow rate of compressed air. This device and method uses a pressure regulator for controlling both pressure and flow. This method provides feedback to Pressure Transducer 2 when controlling in the pressure mode, and to Pressure Transducers 2 and 3 in the flow mode. The pressure Transducers provide a compression ratio for the air to allow for SCFM control.

During the static mode, a signal is received from a controller to signal that the pressure mode is desired. In this mode, the control matches the signal with the pressure on Pressure Transducer 2. The match is obtained by pulsing the pressure and exhaust solenoid valves to hold the correct pressure in the pressure regulator cavity 61. By monitoring the cavity and modulating the valves the pressure can be maintain.

Upon receiving a flow on signal, the pressure and exhaust solenoid valves are modulated to obtain the correct flow rate drop across Pressure Transducer 2 and Pressure Transducer 3.

Figure 7:
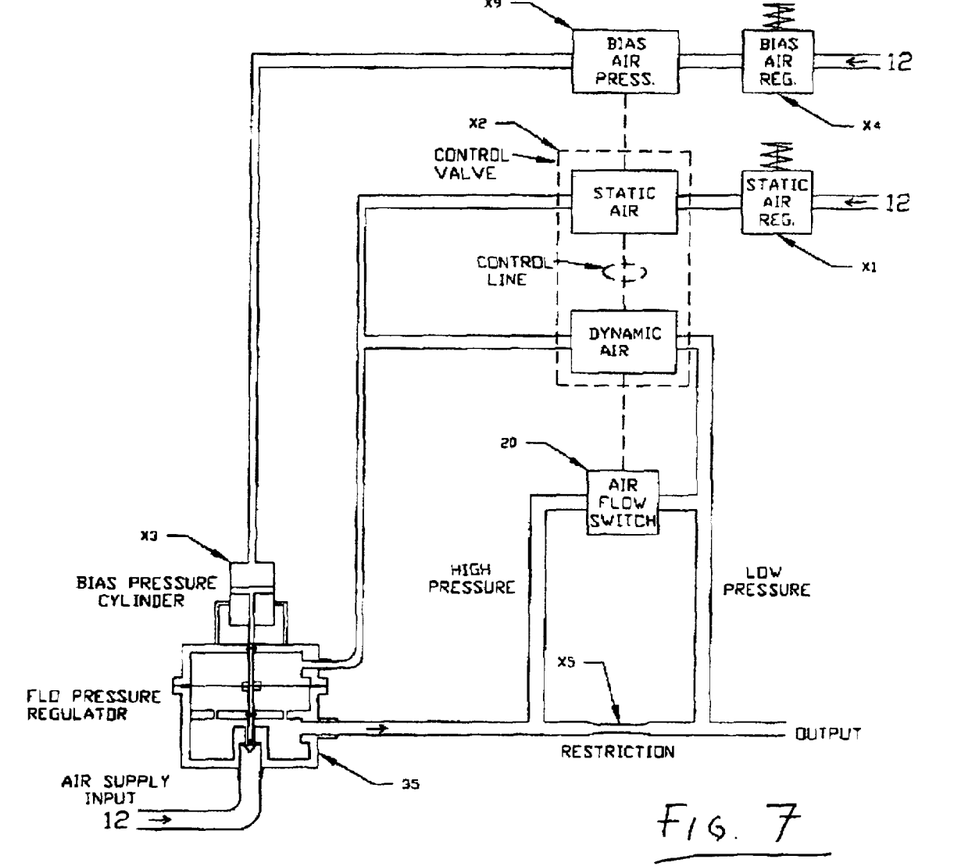
FIG. 7 is a pneumatic and electrical illustration of a fifth embodiment of a device for controlling the flow rate of compressed air.

FIG. 7 illustrates a fifth embodiment of a device for controlling the flow rate of compressed air. This devise and method uses a single regulator for control of both pressure and flow. In comparison to the device illustrated in FIG. 5, which uses a single pressure regulator for both the pressure and flow rate control, the device and method shown in FIG. 7 adds the bias cylinder to the pressure valve and changes the source of feedback based on the state of the flow rate.

In the static mode, no pressure drop is across the restriction x5 and the air flow switch 20 is in an off state. The off state of switch 20 selects the air flow selector x2 to static mode and the bias regulator control valve x9 to off. The output of the air control valve is directed to the pressure/flow regulator 35 control port which adjusts the output to the pressure on the port. The bias regulator valve x9 is selected to off which vents the bias pressure cylinder to atmosphere.

In the dynamic mode, upon air flow through the system, pressure drop occurs at the restriction x5 which causes the air flow switch 20 to activate. The output signal of the air flow switch 20 changes the air control valve x2 from static mode to dynamic mode. The output signal from the air control valve directs the low pressure feedback signal from the output side of the restriction x5 back into the pilot port of the flow pressure regulator. Concurrently, the bias air valve is activated which applies air to the blind end of the bias air cylinder x3 applying a force on the diaphragm 27 forcing the air control valve 28 open. The amount that the valve will open is in proportion to the force applied on both sides of the diaphragm low pressure 29 and high pressure 31, and the bias cylinder pressure.

When the pressure drop decreases to a preset level the air flow switch 20 will reset the system to static.

Figure 8:
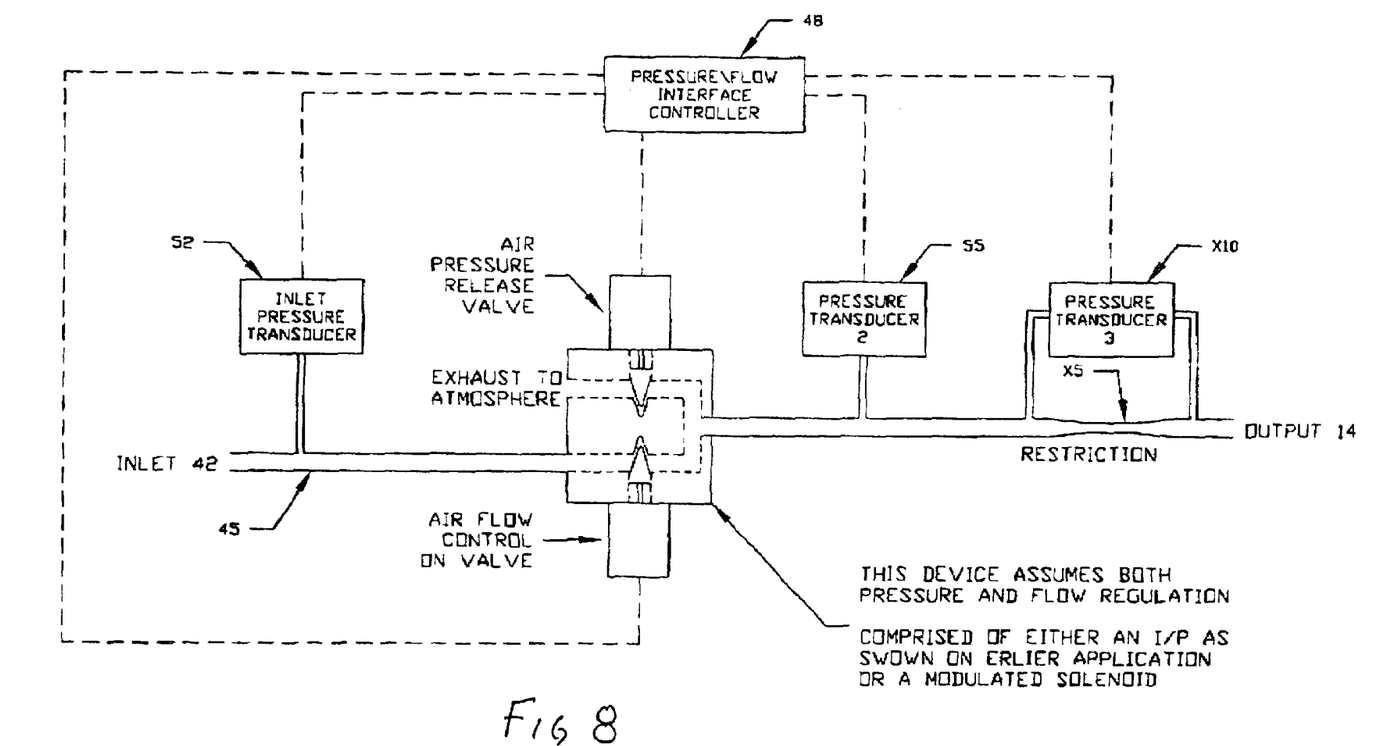
FIG. 8 is a pneumatic and electrical illustration of a sixth embodiment of a device for controlling the flow rate of compressed air.
Figure 9:
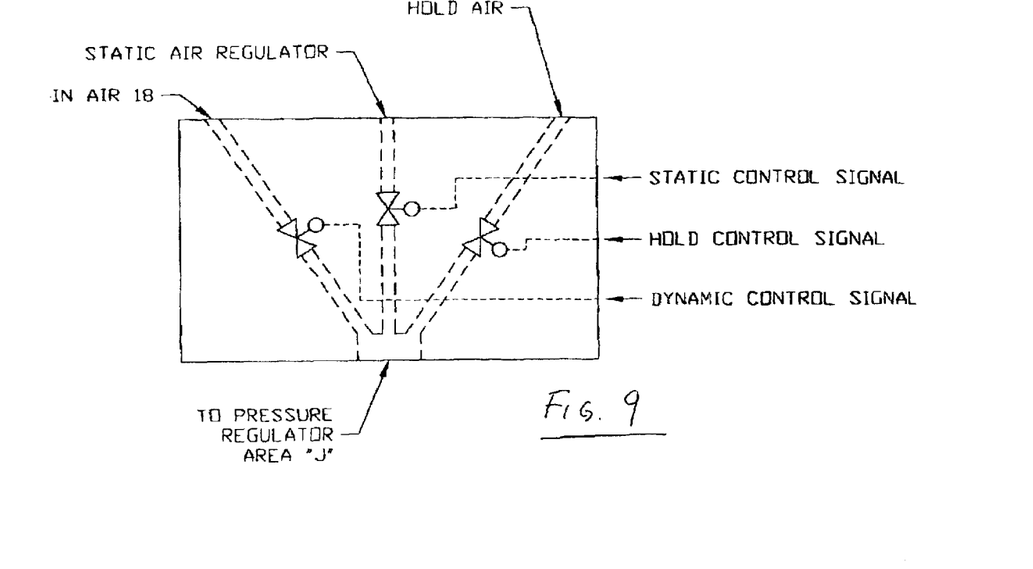
FIG. 9 is an illustration of an air pressure selector.
Figure 10:
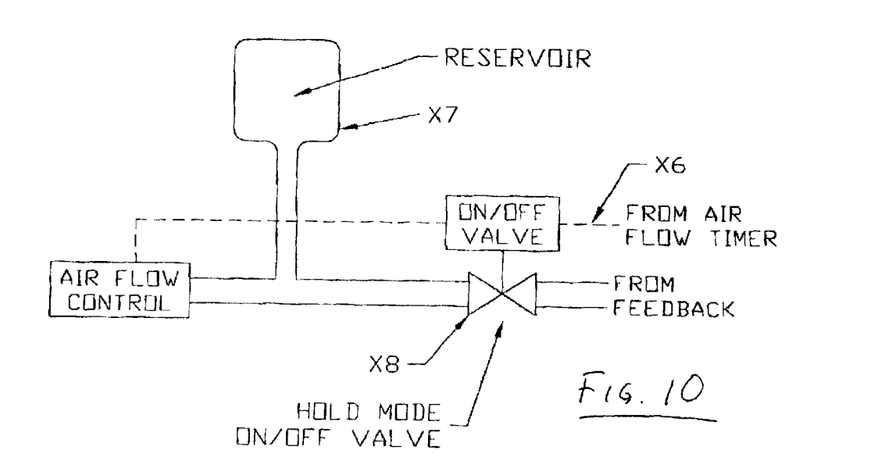
FIG. 10 is an illustration of an air hold control.

FIG. 8 illustrates a sixth embodiment of a device for controlling the flow rate of compressed air. In static mode the air flow on and air flow off valves are modulated to control the pressure to the output. The only sensing element used is the Pressure Transducer 2.

In dynamic mode the controller monitors the interface for a flow/pressure signal and a start signal. Upon receiving a valid interface the air flow on valve is modulated to provide the correct flow rate to the device via 17. The flow rate to the devise is calculated from signals from Pressure Transducer 1 and Pressure Transducer 3 where Pressure Transducer 1 provides the compression ratio of the compressed air and Pressure Transducer 3 provides the pressure differential across a known orifice x5.

It is to be understood that the embodiments disclosed above are merely exemplary of the invention which may be embodied in various forms. Changes maybe made in the details of construction, arrangement and operation of various elements of the invention without departing from the spirit of the invention. For example, the function pressure differential flow meter 49 which includes two pressure transducers 54 and 55 as described above could be performed by a turbine flow meter or alternatively by a heat flow meter. As a further example, the flow rate control feature of particularly the electromechanical embodiment of the invention shown in FIG. 2 might be activated by an electronic signal received from the tool rather than just a pneumatic signal. Therefore, specific structural and functional details disclosed above are not to be interpreted as limiting the scope of the invention, but are presented merely as the basis for the claims and for teaching one skilled in the art to various employ the present invention in any appropriately detailed manner especially as defined in the following claims.

What is claimed is:

1. A method for controlling the delivery of compressed air to a tool, the method comprising the steps of:
   a) receiving compressed air from an air pressurizing source;
   b) determining whether said compressed air is flowing or static,
   c) when said compressed air is flowing, controlling the flow rate by sensing the flow rate of compressed air between a first point and a second point, and comparing the sensed flow rate to a desired flow rate, thereby directing said compressed air to said tool, and;
   d) when said compressed air is static, limiting the pressure of the compressed air to a predetermined maximum value;
   wherein said method further comprises:
      introducing said compressed air into a primary pressure regulator;
      equalizing the pressure of the air output with the pressure set on the static air regulator;
      upon airflow, developing a pressure drop that triggers an airflow switch, which in turn changes the control pressure from regulated to main line air;
      opening the regulator to a full open position; and,
      activating an airflow timer to provide an adjustable delayed control signal.

2. A method for controlling the delivery of compressed air to a tool, the method comprising the steps of:
   a) receiving compressed air from an air pressurizing source;
   b) determining whether said compressed air is flowing or static,
   c) when said compressed air is flowing, controlling the flow rate by sensing the flow rate of compressed air between a first point and a second point, and comparing the sensed flow rate to a desired flow rate, thereby directing said compressed air to said tool, and;
   d) when said compressed air is static, limiting the pressure of the compressed air to a predetermined maximum value,
   wherein said method further comprises:
      using a pressure regulator for controlling both pressure and flow;
      in the static mode, receiving a signal from a controller that the pressure mode is desired;
      matching the signal with the pressure of a first pressure transducer;
      upon receiving a flow on signal, modulating the pressure and exhaust solenoid valves obtain the correct flow rate drop across the first pressure transducer and a second pressure transducer.

3. A method for controlling the delivery of compressed air to a tool, the method comprising the steps of:
   a) receiving compressed air from an air pressurizing source;
   b) determining whether said compressed air is flowing or static,
   c) when said compressed air is flowing, controlling the flow rate by sensing the flow rate of compressed air between a first point and a second point, and comparing the sensed flow rate to a desired flow rate, thereby directing said compressed air to said tool, and;
   d) when said compressed air is static, limiting the pressure of the compressed air to a predetermined maximum value,
   wherein said method further comprises:
      using a single regulator for control of both pressure and flow; and,
      using a bias cylinder to change the source of feedback based on the state of the flow rate.

4. A method for controlling the delivery of compressed air to a tool, the method comprising the steps of:
   a) receiving compressed air from an air pressurizing source;
   b) determining whether said compressed air is flowing or static,
   c) when said compressed air is flowing, controlling the flow rate by sensing the flow rate of compressed air between a first point and a second point, and comparing the sensed flow rate to a desired flow rate, thereby directing said compressed air to said tool, and;
   d) when said compressed air is static, limiting the pressure of the compressed air to a predetermined maximum value,
   wherein said method further comprises:
      modulating the air flow on and air flow off valves are modulated to control the pressure to the output; and, monitoring the interface for a flow/pressure signal and a start signal.

* * * * *